United States Patent [19]
Meeks et al.

[11] 3,777,934
[45] Dec. 11, 1973

[54] SUSPENSION POLYMERIZED POLYVINYL CHLORIDE BEADS AS VAPOR PRESSURE DEPRESSANTS

[75] Inventors: Merritt R. Meeks; Roger F. Monroe; Richard M. Weber, all of Midland, Mich.

[73] Assignee: The Dow Chemical Company, Midland, Mich.

[22] Filed: Feb. 24, 1972

[21] Appl. No.: 229,179

Related U.S. Application Data

[63] Continuation-in-part of Ser. No. 794,413, Jan. 27, 1969, abandoned.

[52] U.S. Cl............ 222/3, 260/85.5 XA, 260/86.3, 260/87.1, 260/87.7, 260/92.8 W
[51] Int. Cl...... B65d 83/14, C08f 3/30, C08f 15/28
[58] Field of Search.......... 260/92.8, 87.5, 85.5 XA, 260/86.3, 87.1, 87.7; 222/3

[56] References Cited
UNITED STATES PATENTS

| | | | |
|---|---|---|---|
| 3,460,351 | 8/1969 | Dalle | 222/3 X |
| 3,706,722 | 12/1972 | Nelson et al. | 260/92.8 W |
| 1,080,263 | 12/1913 | Coleman | 222/3 X |
| 3,322,695 | 5/1967 | Alfrey et al. | 260/31.2 |

Primary Examiner—Harry Wong, Jr.
Attorney—William M. Yates et al.

[57] ABSTRACT

Porous vinyl chloride polymer beads which are substantially devoid of an exterior pericellular layer, disposed under retention in a container of gas under pressure, regulate the useful pressure discharge of the gas.

5 Claims, No Drawings

SUSPENSION POLYMERIZED POLYVINYL CHLORIDE BEADS AS VAPOR PRESSURE DEPRESSANTS

This application is a continuation-in-part of pending application Ser. No. 794,413, filed January 27, 1969, now abandoned.

BACKGROUND OF THE INVENTION

1. Field of the Invention

A relatively small group of well-known chemical substances boiling at temperatures fairly near ordinary room temperature, characteristically of low toxicity, have found widespread application as propellants in "aerosol," i.e., valved containers the contents of which are to be expelled under pressure. Among these substances are the chlorofluorocarbons sold under such names as the Geons or Freons or the like; various low-boiling hydrocarbons such as propane and isobutane; and certain additives to build or suppress pressure such as dichloromethane and 1,1,1-trichloroethane.

A group of compressed gases is similarly employed, coacting with or independent of the foregoing, which usually remain in gaseous form under pressure. These include carbon dioxide, nitrous oxide, nitrogen, dimethyl ether and the like.

In addition, numerous gases under pressure are dispensed from tanks or reservoirs confining them, including fuel gases, ammonia, various fumigants, sulfur dioxide and the like.

It has been desired to make possible the employment of propellant substances having somewhat lower boiling temperatures which, in the state of the art, have been regarded as too volatile. It has been desired also to prolong the propellant action of substances presently in use.

It has been desired to reduce initial discharge pressures within a pressure container, and to protract the duration of workable container interior pressure.

Boiling liquids, remaining liquid only while under pressure, are oftentimes preferred for the reason that their discharge from a valved container occasions only modest decline in pressure since the boiling of the liquid tends to replenish exhausted gas and, within approximate limits, maintain pressure; whereas, the pressure from a nonliquefied gas, being exhausted through a valve, descends linearly.

2. The Prior Art

Acetylene has strong hypergolic tendencies at pressures above about 1.05 kilograms per square centimeter gauge. This fact rendered acetylene impractical to sell, compressed, in gas cylinders in the early years of its use and brought about the widespread use of the "carbide generator" on the Kipp generator pattern. It was discovered that filling the cylinder largely full of loose particulate material, such as sawdust, saturated with acetone, made it possible to sorb and solve acetone upon and within the contents of the said cylinder and permitted the introduction of amounts of acetylene which, absent the particulate matter and acetone, would have been impractical.

Conduit tubing between gas cylinders and cooperating burner heads in propane torches are sometimes filled with fibrous material such as fiber glass or cotton to intercept and break up liquid particles of vaporizing gas to avoid anomalous burner behavior.

BRIEF DESCRIPTION OF THE PRESENT INVENTION

According to the present invention, a system wherefrom gas is delivered under its own or partially its own pressure, from a closed vessel containing said gas or a liquid which boils to release said gas, is provided with means to extend the useful duration of delivery of such gas pressure. The invention is not limited thereto, but is usefully exemplified by an aerosol container conventional in all things except for the sole modification of the present invention; it is modified by disposing therein a vapor pressure extending amount of small particles of a highly porous vinyl chloride polymer wherein the individual polymer beads are devoid of exterior pericellular layer.

The polymers to be employed in the present invention are polyvinyl chloride or an interpolymer from a comonomer feedstock of at least 80 percent vinyl chloride with one or a plurality of acrylonitrile, vinylidene chloride, vinyl acetate, or a loweralkyl ester of acrylic or loweralkyl acrylic acid, wherein loweralkyl is alkyl of from one to eight, both inclusive, carbon atoms and moieties from comonomer other than vinyl chloride are present in the amount of not more than 20 weight percent be weight of resulting polymer.

The size and shape of the particles is a matter of choice and those that are commonly produced for use in the plastics industry are excellent. They are commonly spherical to subspherical and of an approximately uniform 200 to 300 micron diameter. However, nonuniform particles can be employed as can particles which are deliberately manufactured to be of smaller or larger size, and other than as shperical particles. Thus, polyvinyl chloride suspension polymerized particles that are as small as 25 microns diameter are usable, and in contrast, particles of up to 1000 microns are usable also. For convenience, a particle of such polymer of whatever size and shape is often hereinafter called a bead.

Especially good results have been obtained when employing spherical to subspherical particles of nearly uniform 300 micron diameter, manufactured by an invert emulsion process such that the resulting particles are highly bibulous, and, in terms of bulk quantity, represent approximately 40 percent solids by volume of total particle. Of whatever shape or form, the polymers in form to be used herein are characterized by being devoid of an exterior pericellular layer. The manufacture of such beads is described in patent application Ser. No. 51,866 filed July 2, 1970, now U.S. Pat. No. 3,706,722.

The quantity of beads to be employed can vary within wide limits. At least a minimal vapor-pressure extending amount is to be used. The resulting effect of the presence of the said particles or beads upon the pressure of a boiling liquid propellant appears to vary to at least some extent, with the amount of such porous polymer present. Thus, when only a modest extension of the duration of time that a propellant liquid pressure is maintained in a container is desired, only a modest amount of the porous polymer will be employed. When it is desired to exhibit the phenomenon in a maximum degree, the aerosol or like container may be largely or substantially entirely filled with the beads, relying upon interstitial spaces to contain propellant and, if different, propelled contents. In deciding upon the amount of beads to be employed, it must be recognized that the positioning of such plastic particles within the aerosol container displaces, to at least some extent, economically important other contents that might be present.

In practice, when, of total possibly available interior capacity of an aerosol container, less than five percent has been occupied by the apparent volume of the plastic particles, the extension of propellant pressure time and other benefits according to the present invention, although measurable, appear to be economically minor. When from one-twentieth to one-fourth the interior capacity of a container containing also gas propelled contents and propellant is occupied by the said plastic particles, good results are obtained. When more than about one-fourth of the capacity of such container is occupied by the plastic particles or beads, displacement of economically significant other contents becomes a major factor. The adding of such plastic particles in a volume quantity representing from one-tenth to one-fourth the total interior capacity of the container for a gas-space or vapor-propelled contents of which it is to modify the propulsion, have given good over-all results.

In another approach to the amount, typically the volume of sorptive beads to be employed, the volume of the aerosol container interior occupied by propellant, when fully charged, is first noted; in terms of this volume, the employed volume of beads can range from about 10 to about 200 percent. Good results are obtained when employing beads in the apparent volume of from about 25 to about 100 percent of the apparent propellant volume.

The manner in which the beads are disposed is optional. They have been employed unconfined in the aerosol container with good results. Their confinement is regarded as being desirable since, unconfined, they may be forced or entrained through the eduction tube and may obstruct actuator valves and like parts. Good results are obtained when the beads are confined with a fabric bag of which the fabric mesh is fine enough to confine the beads but sufficiently porous to admit free transfer of fluids. Good results are obtained also, in situations where minimal agitation is expected, when the beads are positioned in the bottom of a container for gas propelled contents and held in place by paper, cotton, felt, or other wadding pressed in above them, or beneath a porous disphragm that is held in place by a spring ring or the like. Alternatively, the beads can be worked up into and as an essentially integral component of a paper or the like which is thereafter disposed in the said container, in pieces large enough that obstruction of education tubes and the like is obviated. Other manners of disposal are within reach of the art.

The action of the present invention is believed to relate to the mechanical sorption-desorption of the gaseous to liquefied-gaseous materials upon the absolute surface of the present particles.

While the inventors do not wish to be limited to any theory, they conjecture that the present invention functions as the various propellants and the like are held by forces of surface association as quasi-liquids when, but for such forces, they would be gases. Thus, it seems that, to at least the extent of surface forces, the propellants are of elevated boiling temperature, or of reduced rate of evolution of vapor.

The surface phenomena by which this invention is believed to function appear to depend only slightly, or not to depend at all, upon the nature of the propellant; similarly, as far as is known, the instant invention appears to be independent, or nearly so, of the identity of propelled can contents. It is noted that the vinylic polymers to be employed are of very low reactivity and insoluble in most solvents including all those commonly encountered in aerosol practice. The polymers have only limited tendency to be wetted by water and, insofar as has been observed, the presence of water does not interfere with the present invention.

The instant invention is not limited to the propulsion of contents from an aerosol container. It is practiced with equal success whereever it is desired to release a vapor, or the vapor from an evaporating liquid, over an extended period of time and with suppression of initial pressure while preserving terminal pressure. Thus, in the discharge of various fumigant gases under self pressure, the vessels from which they are to be discharged can be partially filled with beads according to this invention, with corresponding external interval of vapor discharge in the cases of, for example, ammonia, sulfur dioxide, methyl bromide, sulfuryl fluoride, dichloroethane, monochloroethane, diethyl ether, cyclopropane, ethylene, 2,2-dichloro-1,1-difluoroethyl methyl ether, and the like. Also, the present invention can be practiced successfully in the management of a condensable, vaporizing refrigerant liquid, in a heat transfer situation including a refrigeration system when it is desired, for example, to reduce pressure transients within the refrigerant system. Similarly, the instant invention is of use in the carburetion and exhibition for combustion of combustible vapors from vaporizing liquid fuels. It is of value also in the distribution of respirable gases as in the air tanks of Self-Contained Underwater Breathing Apparatus.

The principle of the instant invention is fully demonstrated, and the best mode of practicing it now known to the inventors is as set forth in the following examples.

EXAMPLE 1

A. Preparation of Polymer Beads

Into an upright cylindrical polymerization vessel having a capacity of 20 gallons and equipped with an agitator and jacketed for heating and cooling was charged 28 pounds of water, containing 0.1 weight percent of a water-soluble hydroxy propyl methyl cellulose ether having a viscosity of about 500 cps., 0.28 pounds of monomer-soluble dispersing agent (sorbitan monostearate) and 5.0 grams of the monomer-soluble polymerization initiator isopropyl percarbonate (added as a 20 percent solution in xylene). The reactor was then evacuated and 56 pounds of vinyl chloride added. The agitator was then turned on and the reactor heated to 50°C. and maintained at that temperature until a conversion of monomer to polymer of about 5 percent was accomplished. Thereafter, 84 pounds of water containing the water-soluble hydroxy propyl methyl cellulose ether was added to the reactor to cause a phase inversion wherein water became the continuous phase.

The reactor was then heated to 55°C. and the reaction continued to a 40 psig pressure drop, after which such reactor was cooled, vented, and emptied. The polymer formed was filtered and dried. This product is hereinafter identified as Run No. 1. The following Table I provides physical property information for such polymer.

By way of comparison, in a separate experiment, a polymer was prepared as described herein but where the water phase was continuous throughout the reaction and the sorbitan monostearate was omitted. This product is designated as Run No. 2. Physical property information for this material is also included in the following Table I.

The data presented in Table I illustrate that the polymer prepared by the process of the present invention (Run No. 1) is characterized by a larger and more uniform particle size, is of a higher porosity as evidenced by its ability to more readily absorb plasticizer, has improved flow properties, and has significantly less gel formation; as compared to polymer prepared in the conventional manner by utilizing water as the continuous phase throughout the reaction (Run No. 2).

TABLE I

|  | Run No. 1 This Invention | Run No. 2 For Comparison |
|---|---|---|
| Absolute Visc. | 1.99 | 2.00 |
| Dry Density (g/cc) ASTM D-1755 | .495 | .435 |
| Dry Flow (sec/100 cc) ASTM D-1755 | 5.8 | 8.0 |
| Plasticizer Absorb. (pts./100 pts.) ASTM D-1755 | 125 | 107 |
| Plasticized Density (g/cc) ASTM D-1755 | .481 | .343 |
| Plasticized Flow (sec/100 cc) ASTM D-1755 | 8.7 | 21.0 |
| Gels/Min. (visual observation of sheeted polymer) | | |
| 4 | 4 | 14 |
| 5 | 1 | 5 |
| 6 | 0 | 2 |
| Screen Analysis | | |
| 20 mesh | 0.1 | — |
| 50 mesh | 27.7 | .3 |
| 70 mesh | 72.2 | 3.3 |
| 100 mesh | 0 | 36.3 |
| 140 mesh | 0 | 45.2 |
| 200 mesh | 0 | 12.8 |
| Pan | 0 | 2.1 |

In addition, when individual particles of the material identified as Run No. 1 were placed under an electron microscope, it was observed that such polymer particles were of a highly uniform substantially spherical structure which were characterized by having an outer surface which is of essentially the same structure as the inner surface, i.e., that such particles do not have a thickened exterior cell wall which is characteristic of prior known materials. By way of contrast, the materials herein described as Run No. 2, when examined under an electron microscope, evidenced irregular size and shape along with large opaque areas in the center of the particle, which are solid polyvinyl chloride and which give rise to undesirable "fish-eyes." Further, such particles showed evidence of a thickened exterior cell wall.

B. Utilization of the Polymer Beads in an Aerosol Container

Two glass aerosol containers of nominal 8 ounce capacity were provided. In each were placed 1.4 grams cotton, and a standard charge of a mixed Freon propellant consisting of chlorofluorocarbon propellants and providing an initial pressure of 71.5 pounds per square inch gauge in each container. However, the first container was provided also with 16.6 grams polyvinyl chloride beads of Run No. 1 (comprising about one-eighth of the container volume) confined in a cotton fabric bag; the other was without said beads.

The containers were bled to reduce internal pressure and exhaust contents for identical intervals of time and identical conditiions of release; and periodically checked for remaining internal pressure.

By the time the second container, without polyvinyl chloride beads, had come down to a pressure of 57.5 pounds per square inch gauge, the container differing only in the presence of the beads had a pressure of 59 pounds per square inch gauge. When the container without beads had a pressure of 50 pounds, the container with beads had a pressure of 50.5 pounds. The experiment was continued and, at the last observed measurement, the container modified by containing the polyvinyl chloride beads (Run No. 1) exhibited a contents pressure of 10 pounds per square inch gauge, while the container without beads had 9.5 pounds, same basis.

Without further pressure measurements, then, the containers were valved open and held thus to apparent exhaustion as indicated by the end of the hissing sound of issuing propellant. Container 1, with beads, required approximately 15 seconds longer than container 2 without beads, an approximately 20 percent extension of the time to exhaustion subsequent to the last pressure measurement.

In another comparative experiment, as described above, the polymer beads (Run No. 2) were substituted for the beads of Run No. 1. This container (container 3) required about the same time as container 2 for apparent exhaustion of the propellant. On the evidence of sustained pressure as measured, and upon the time to exhaustion of evident pressure, it was ascertained that the polymer beads (Run No. 1) appreciably extended the propellant delivery time.

EXAMPLE 2

The present example was carried out in a manner similar to Example 1; however, the beads (Run No. 1) were confined by a pledget of cotton pressed to hold them into the bottom of the aerosol container; the propellant was isobutane, and, into each bottle, 20 cc were charged. In bottle number 1, approximately 10 grams of beads were provided, while in bottle number 2, no beads were provided.

Each bottle was discharged for 5 seconds and a pressure reading taken; the procedure repeated, and subsequent pressure readings taken at 5 second blow intervals. The results measured were as shown in Table II.

TABLE II

| Cumulative Blow Time, Seconds | Remaining Pressures (psig) Bottle No. 1 | Bottle No. 2 |
|---|---|---|
| 0 | 36.5 | 36.5 |
| 5 | 30.5 | 28 |
| 10 | 27.5 | 24.5 |
| 15 | 26.0 | 20.5 |
| 20 | 23.5 | 19.5 |
| 25 | 22.5 | 17.0 |
| 30 | 20.0 | 16.0 |
| 35 | 19.5 | 14.5 |
| 40 | 17.0 | 14.5 |
| 45 | 17.5 | 12.0 |
| 50 | 14.5 | 12.0 |
| 55 | 13.0 | 10.0 |

It was noted that Bottle No. 1 continued to provide strong propellant pressure substantially after the beads appeared dry and no liquid propellant was in view, while liquid propellant was in evidence in Bottle No. 2 which contained no beads.

EXAMPLE 3

In the present example, an aerosol container with cotton and tap water was compared with one having cotton, tap water, beads, and the sodium salt of a sulfonated, dodecylated diphenyl oxide detergent. In the first container, there were one gram cotton, 45 grams tap water, two grams of polymer beads (Run No. 1), and a gram of 45 weight percent aqueous solution of the detergent; in the second container were one gram cotton and 48 grams water. The containers were then identically charged with 3.5 grams isobutane.

Pressures of both were measured, periodically, after identical discharge intervals.

As initial pressures, the first container had 40.5 and the second 41 psig. The first had a pressure of 40.5 and 39.5, respectively, when the second had pressures of 38 and 38, respectively. The first showed 26.5 when the second showed 26, and, at the last reading, 17.5 when the other had 16.5 Delivery of water or water with detergent was smooth in each instance. The water bearing detergent tended to foam, as emulsified propellant escaped.

EXAMPLE 4

Representative of liquids boiling spontaneously at ambient temperatures, methyl bromide is studied for retention upon the polymer beads of the instant invention. Odorless, colorless, substantially devoid of sensory notice of warning, methyl bromide is a highly toxic substance widely used in the fumigation of space, structures, premises, merchandise, and nursery stock. To such use it is carried in pressure containers. In use, such container is opened and the contents permitted to vent, usually under autogenous pressure, into air, or space, adjacent a locus at which methly bromide fumigation is desired. No form of life is known to survive massive methyl bromide fumigation. Seeds and spores may survive lighter attacks.

Sometimes it is desired to prolong the issue time during which the vaporizing liquid issues from a pressure container. Upon other occasions, it is desired to minimize spattering of an ebullient surface and consequent entrainment and voiding of liquid material. For various reasons, the present invention is attractive in the management of liquefying gases.

A heavy glass bottle of undetermined capacity but approximately 500 milliliters ("citrate bottle") was charged with approximately 200 grams subspherical beads of polyvinyl chloride of Run No. 1 and into the bottle with beads was charged methyl bromide in the amount of approximately 142 grams, 71 weight percent of beads. As the methyl bromide was charged into the bottle with beads, it seemed to disappear without wetting the beads. Late in the addition of the methyl bromide, the beads gave the appearance of being slightly damp.

At substantially the same time, a substantially identical bottle was charged with an essentially identical amount of methyl bromide absent the polymeric beads.

The bottles were lightly capped and placed under a hood with forced ventilation and provision for immediate and extensive air dilution at the outlet of the ventilator; the bottles were held thus for 2 days. By total weight the bottle containing methyl bromide had lost a substantial amount of contents; loss was not ascertained exactly, but was on the order of 30 percent of original weight of methyl bromide. In fact, it was a loss of more than 20 and less than 50 percent of the liquid contents. In contrast, the bottle with methyl bromide sorbed upon polymer beads had lost a very small amount, again not ascertained, but on the order of 5 percent; in fact, more than one and less than 10 percent by weight of original methyl bromide charge.

Both bottles were then refrigerated and examined periodically, and it was ascertained that the methyl bromide liquid level consistently declined in the bottle containing methyl bromide only; while total weight of the bottle containing methyl bromide sorbed upon polymer beads remained substantially constant.

When beads are removed from the bottle containing methyl bromide sorbed upon polymer beads, and beads exposed at room temperature, the methyl bromide desorbs promptly and is released.

Similarly, when a pressure container with handwheel release valve, intended to hold 10 pounds methyl bromide, is first charged with polymer beads and, subsequently, with methyl bromide, approximately 7 pounds, it is noted that, upon the opening of the valve, the container releases methyl bromide under lively pressure but for a period of time substantially longer than the exhaustion time of the same container without beads.

When it is desired to apply methyl bromide at a defined locus, as in the bottom of a closeable trench in soil fumigation, the beads loaded with methyl bromide are usefully applied directly and covered, to release their methyl bromide after being covered.

In similar manner, the fuel tank of a truck of which the engine consumes liquefied gaseous fuel, is loaded with the beads and then with the liquefying aliphatic hydrocarbon fuel. The fuel then cannot splash; but is released at a staisfactory rate for the engine, under autogenous pressure.

Similarly, the present invention renders more orderly the release of ammonia from a container in which the anhydrous gas is stored.

What is claimed is:

1. In an article of manufacture wherefrom gas is delivered under its own pressure from a closed pressure confining vessel the improvement consisting of providing in said vessel in an amount of from one-twentieth to one-fourth of the interior capacity of said vessel a suspension polymerized vinyl chloride polymer selected from the group consisting of polyvinyl chloride and interpolymers of at least 80 percent vinyl chloride with one or a plurality of acrylonitrile, vinylidene chloride, vinyl acetate or a loweralkyl ester of acrylic or lower-alkyl acrylic acid wherein loweralkyl is alkyl of from one to eight carbon atoms said polymer being in the form of individually spherical porous beads each of said beads having an apparent means diameter of from about 25 to 1000 microns said beads being substantially devoid of an exterior pericellular layer and wherein the outer surface of said beads is of essentially the same structure as the inner surface thereof.

2. The article of claim 1 wherein said vinyl chloride polymer is polyvinyl chloride.

3. The article of claim 2 wherein said beads have an apparent mean diameter of about 300 microns.

4. The article of claim 1 embodied in an aerosol can.

5. The article of claim 1 embodied in a fumigant self-propelled composition.

* * * * *